F. ALLEN.
FREEZING TANK FOR PLATE ICE MACHINES.
APPLICATION FILED JUNE 29, 1907.
905,622.
Patented Dec. 1, 1908.
2 SHEETS—SHEET 2.
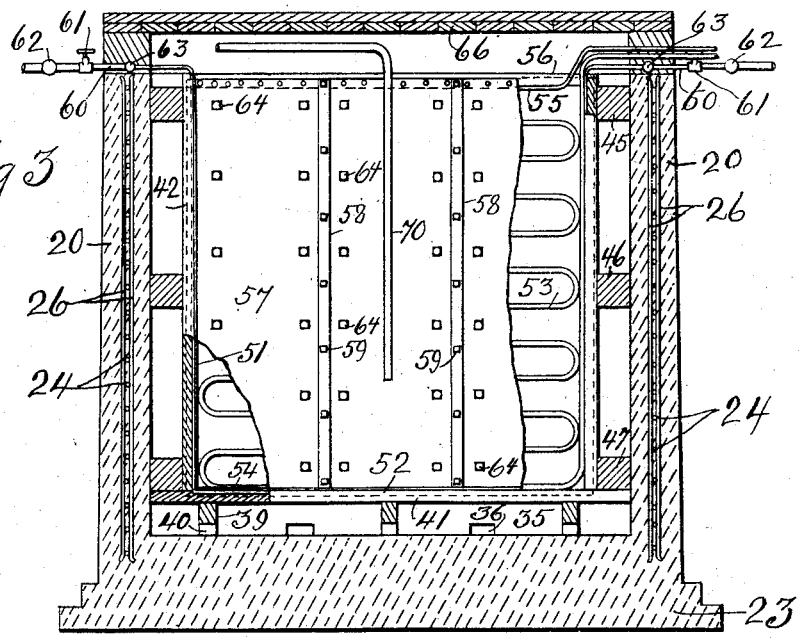
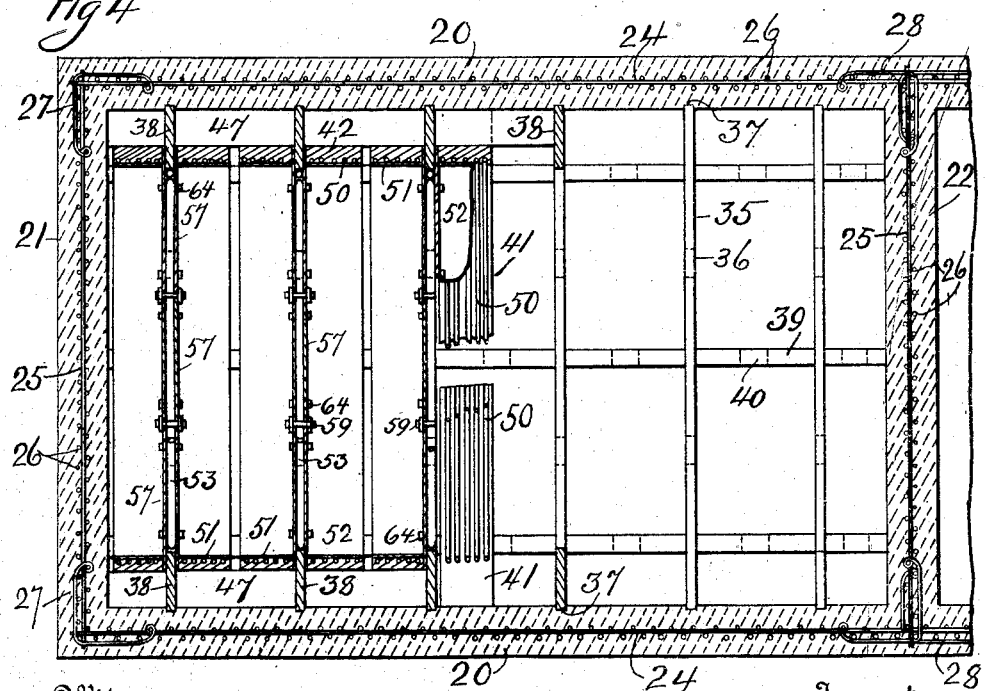

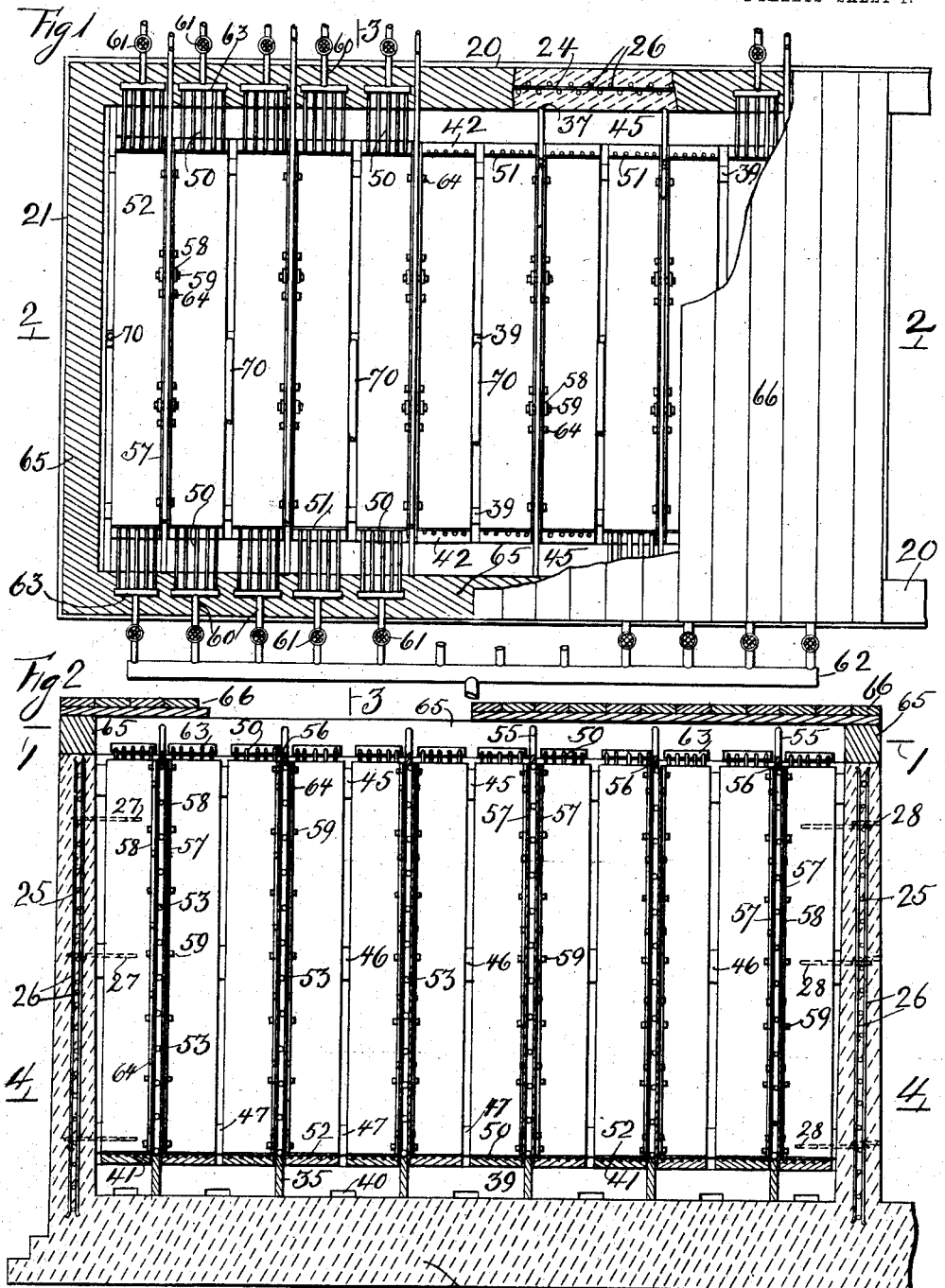

UNITED STATES PATENT OFFICE.

FRANK ALLEN, OF ELIZABETH, NEW JERSEY.

FREEZING-TANK FOR PLATE-ICE MACHINES.

No. 905,622.  Specification of Letters Patent.  Patented Dec. 1, 1908.

Application filed June 29, 1907. Serial No. 381,432.

*To all whom it may concern:*

Be it known that I, FRANK ALLEN, a citizen of the United States, and a resident of Elizabeth, in the county of Union and State of New Jersey, have invented certain new and useful Improvements in Freezing-Tanks for Plate-Ice Machines, of which the following is a specification.

The invention relates to a freezing tank for refrigerating apparatus represented and described in a general way, in the accompanying application for absorption refrigerating apparatus. Its object is the production of a refrigerating tank which is specially applicable for plate ice.

Referring to the drawings, Figure 1 shows a top plan view of a tank with its cover partly broken away, exemplifying the invention, and also a partial section as on the line 1, 1 of Fig. 2, Fig. 2 represents a section of Fig. 1 on the line 2, 2, Fig. 3 is a section of Fig. 1 on the line 3, 3, Fig. 4 represents a partial section of Fig. 2 on the line 4, 4, and a partial top plan view of the tank with some of the parts removed.

The tank comprises the tapering sides 20, tapering ends like 21, tapering bulkheads like 22 and bottom 23 of concrete, which is reinforced with the horizontal iron or steel rods 24, 25, upon the opposite of which are located the vertical rods 26. At the corners of the tank angles 27 tie together a number of the horizontal rods 24, 25, and tees 28 tie a number of the horizontal rods 24 with the rods 25 in the bulkheads 22.

On the bottom of the tank are located the bottom cross sills 35 having the notches 36 or openings in their lower edges. The sills 35 fit in notches 37 formed in the sides 20 of the tank. On top of the cross sills 35 are located the vertical side sills 38, the outer edges of which fit the said notches 37. The said sills are all preferably of wood.

Between the bottom cross sills 35 are located the longitudinal bottom spreaders 39 which bear on the bottom of the tank, and have the notches or openings 40 on their bottom edges. On top of the longitudinal spreaders 39 are fastened the cross planks 41, which extend to the inner faces of the side walls 20 of the tank. From the cross planks 41 extend the vertical planks 42. Longitudinal string pieces 45, 46, 47 separate the vertical planks 42 from the sides 20 of the tank and are located between the vertical side sills 38. The spreaders, planks and string pieces are preferably of wood.

In the inner faces of the vertical planks 42 and cross planks 41 are formed grooves for the brine or thawing off pipes 50. Over the said brine pipes on the vertical planks 42 are secured the plates 51 preferably of steel, and over the said pipes in the grooves of the cross planks 41, are secured the plates 52, thereby obtaining smooth surfaces with said plates for forming the cakes or plates of ice.

Freezing coils 53 having the bottom legs 54 bear on the cross sills 35 and are located between the vertical side sills 38. On the upper member 55 of the said freezing coils are located the upper cross sills 56.

The sides of the refrigerating coils are covered with the side plates 57 preferably of steel, and which are fastened to the upper cross-sills 56, the vertical side sills 38 and the bottom cross-sills 35. They are made in sections which are clamped to the sides of the coils by means of the bolts 64 and the vertical strips 58 and bolts 59. The brine pipes 50 are represented in sections of five which are connected by the manifolds 63. From the said manifolds extend pipes 60 having valves 61 and which are connected with the main headers 62.

A frame 65 is located on the top edge of the concrete walls of the tanks. A cover 66 in two parts is shown on the top of the frame 65, which is put in place during the process of refrigeration.

Air pipes 70 extend into the tank with the freezing plates, to force jets of air into the water while being frozen, which stirs the same and prevents air bubbles remaining therein.

With the freezing tank as described, it will be noted that a frame is located on the inside thereof which separates the freezing space from the side and bottom of the tank, which prevents the tank cracking during the process of freezing. Between the frame, and the sides, ends, and bottom of the tank are consequently formed what I term dead water spaces, which being poor conductors of heat, prevent heat being conducted to the water from outside of the tank and allows the formation of cakes of ice with square corners.

The notches 36 in the bottom cross sills 35 and the notches 40 in the longitudinal spreaders 39 secure means, for allowing the water in the bottom of the tank to spread over the whole surface thereof, and allows the cleaning of the said bottom of the tank.

Having described my invention I claim:

1. In a freezing tank the combination of bottom cross sills, longitudinal spreaders on the bottom of the tank between the cross sills, bottom cross planks on the spreaders, vertical planks extending from the cross planks, the said planks separated from the sides and bottom of the tank, coils embedded in the said planks, and freezing coils on the cross sills.

2. In a concrete freezing tank the combination of bottom cross-sills, vertical side-sills extending from the cross sill and their outer vertical edges bearing against the sides of the tank, longitudinal spreaders on the bottom of the tank and between said cross sills, cross planks on the spreaders, vertical planks extending from the cross planks and separated from the sides of the tank, thawing off pipes embedded in the cross planks and extending up in said vertical planks, freezing coils between each cross sill and its vertical side sills and side plates for the freezing coils.

3. In a concrete freezing tank the combination of bottom cross sills, vertical side sills on top of the cross sills with their outer vertical edges bearing against the sides of the tank, longitudinal spreaders on the bottom of the tank and between said cross sills, cross planks on the spreaders, vertical planks extending from the cross planks and separated from the sides of the tank, thawing off pipes embedded in the cross planks and extending up in the said vertical planks, manifolds connecting the ends of the thawing off pipes, freezing coils between each cross sill and its vertical side sills, and side plates for the freezing coils.

4. In a freezing tank for plate ice the combination of bottom cross-sills having notches in their bottom faces located on the bottom of the tank, longitudinal spreaders on the bottom of the tank having notches in their bottom faces extending between the cross sills, vertical sills adjacent to the sides of the tank and bearing on the cross-sills, horizontal cross planks on the said spreaders, longitudinal sills adjacent to the sides of the tank and between the vertical sills extending from the cross sills, upright planks on the horizontal planks bearing against the longitudinal sills, pipes in grooves in the horizontal planks and in the vertical planks, plates over the horizontal and vertical planks, freezing coils bearing on the bottom cross sills between the cross planks, an upper cross sill on top of each set of freezing coils, and side plates covering both sides of the freezing coils.

Signed at the borough of Manhattan in the county of New York and State of New York this 19th day of June A. D. 1907.

FRANK ALLEN.

Witnesses:
 MARTIN ZIMANSKY,
 JOHN J. MILLIN.